United States Patent [19]

Carter

[11] Patent Number: 5,078,336
[45] Date of Patent: Jan. 7, 1992

[54] SPIN-STABILIZED MISSILE WITH PLUG NOZZLE

[76] Inventor: Gregory E. Carter, 3120 Kings Lake Blvd., Naples, Fla. 33962

[21] Appl. No.: 382,620

[22] Filed: Jul. 21, 1989

[51] Int. Cl.$^5$ .............................................. F42B 10/30
[52] U.S. Cl. ............................. 244/3.22; 239/265.19; 244/3.23; 60/230
[58] Field of Search ............................ 244/3.23, 3.22; 239/265.11, 265.19; 60/230

[56] References Cited

U.S. PATENT DOCUMENTS

| | | | |
|---|---|---|---|
| 1,307,607 | 6/1919 | Wilkins | 244/3.23 |
| 2,405,415 | 8/1946 | Eksergian | 244/3.23 |
| 2,500,537 | 3/1950 | Goddard | 244/3.23 |
| 2,611,317 | 9/1952 | Africano | 244/3.23 |
| 2,683,962 | 7/1954 | Griffith | 239/265.11 |
| 2,968,245 | 1/1961 | Sutton et al. | 244/3.23 |
| 3,343,766 | 9/1967 | Biehl et al. | 244/3.23 |
| 3,367,113 | 2/1968 | Mainhardt | 244/3.23 |
| 3,414,217 | 12/1968 | Kesting | 244/3.23 |
| 3,830,431 | 8/1974 | Schwartz | 239/265.11 |
| 4,194,706 | 3/1980 | Detalle | 244/3.23 |

OTHER PUBLICATIONS

G. P. Sutton, Rocket Propulsion Elements, 5th ed., chart-p. 60 (pub. by Wiley-Interscience).
G. V. R. Rao, "Recent Developments in Rocket Nozzle Configurations", ARS Journal, p. 1488 (Nov. 1961).
Recommended Applied Research Programs for Advance Rocket Propulsion Systems-Pratt & Whitney Aircraft.
A. Stokes, Comparison of Performance of a Double-Cornered Plug Nozzle with a Conventional Convergent-Divergent Rocket Nozzle, Report No. RK-TR-72-17 (Jun. 30, 1972).
J. E. Draim, Attitude Stabilization Using a Rotating Plug Nozzle, Technical Report No. 158 (Jul. 1966).
W. J. Barnes, Jr., Thrust Vectoring with a Plug Nozzle by Plug Translation Published Thesis (Aug. 1964).

*Primary Examiner*—Michael J. Carone

[57] ABSTRACT

A simplified and cost-effective missile is disclosed which features a generally cylindrical casing, an aerodynamic warhead, and a plug nozzle. The casing of the missile contains a combustible propellant. The plug nozzle comprises a generally radially symmetric plug fitting within an open rear end of the casing such that an annular passageway is formed therebetween, through which exhaust gases from combustion of the propellant pass. The shape of the plug is chosen such that the cross-sectional area of the annular passageway varies in a predetermined fashion, to cause a desired thrust to be generated by combustion of the propellant. A number of vanes are spaced radially around the annular passageway and are inclined with respect to the centerline of the missile, so that the reaction of the exhaust gases on them provides a twisting force on the missile, whereby it spins and is stabilized in flight. In one embodiment, the vanes are not moved during the flight of the missile; in another embodiment, a servo-mechanism is provided for moving the vanes during the flight of the missile and thus altering its trajectory of flight.

16 Claims, 4 Drawing Sheets

SPIN-STABILIZED MISSILE WITH PLUG NOZZLE

FIELD OF THE INVENTION

This invention relates to the field of simple and cost-efficient missiles. More particularly, the invention relates to a missile which is spin-stabilized in flight by spin imparted to it by combustion of the propellant fuel, and which avoids use of external fins or other external appendages for guidance.

BACKGROUND OF THE INVENTION

Numerous publications show a wide variety of designs for missiles. However, none of them is as simple, as cost-efficient and as effective in use as would be desired.

Exemplary designs include that shown in U.S. Pat. No. 511,418 to Gathmann, which shows a projectile in which a rear section 2 contains a charge of a propellant. When the propellant is ignited, the exhaust of the burning charge reacts against spirally arranged flanges 6 to impart spiral motion to the projectile in flight. The end of the chamber 2 containing the propellant is formed by a flat plug 8, which is forced from the end of the chamber upon ignition of the propellant.

U.S. Pat. No. 2,927,535 to Abramson et al shows a projectile which is apparently to be launched from a cannon or the like and which does not contain an internal propellant. The projectile is adapted to be rotated in flight by a "slipping driving means 17, 18".

U.S. Pat. No. 2,922,365 Fredette et al shows an aerial missile which is to be dropped from an airplane or the like, and which comprises external fins or spoilers 52 to stabilize its flight.

U.S. Pat. No. 3,390,850 to Dahlke et al shows a rocket having fins which pivot outwardly upon launching and which are stated to induce spin of the rocket in flight.

U.S. Pat. No. 2,405,415 to Eksergian shows a rocket projectile which also has outwardly pivoting fins 18 which cause it to spin in flight. The Eksergian projectile includes internal propellant 8 and shows a converging-/diverging nozzle structure.

U.S. Pat. No. 2,500,537 to Goddard shows an aircraft comprising a combustion chamber which is mounted for rotation in flight, and which is connected to a converging/diverging nozzle member N.

Finally, U.S. Pat. No. 4,194,706 to Detalle shows a nozzle member which is apparently to be attached to a conventional converging/diverging nozzle for a missile and which comprises internal fin members 3 which are intended to cause the missile to rotate in flight.

From the above, it will have been appreciated that while the art teaches that it is desirable to spin projectiles in flight, such that their angular momentum can contribute to the accuracy of their trajectory, the devices proposed for doing so to date have been relatively complex and cumbersome. Furthermore, many designs have involved fins external to the fuselage of the missile, providing substantial aerodynamic drag penalties. These external fin devices also make it difficult to carry such projectiles in desired locations, e.g., under the wings of aircraft, both for reasons of space consumption and again because the external members add substantial aerodynamic drag, thus slowing the aircraft and making it less fuel efficient.

Furthermore, it will have been appreciated that each of the devices described above which employ combustion of an internal propellant for propelling the missile involve use of converging/diverging exhaust nozzles, as is nearly universal in projectile and rocket design.

SUMMARY OF THE INVENTION

Accordingly, it is an object of the invention to provide an improved missile which comprises a internally-combusted propellant and which spins in flight due to forces exerted on internal reaction surfaces disposed in the path of the exhaust gases.

It is a further object of the invention to provide an improved missile which is spin-stabilized in flight and which does not involve external fin members or the like, thus avoiding significant aerodynamic drag during flight of the missile, or when carried beneath an airplane or the like.

It is a further object of the invention to provide a simpler and more cost-efficient projectile design than has been available previously.

The above needs of the art and objects of the invention are met by the present invention which comprises an improved missile comprising a generally cylindrical casing housing a propellant. The casing has an open rear nozzle end. A radially symmetric plug is disposed within the open rear end. An annular opening is formed between the plug and the inner surface of the open nozzle end of the casing, through which the exhaust gas from combustion of the propellant is passed, propelling the missile towards its target. The shapes of the plug and of the internal surface of the nozzle cooperate to define a desired cross-sectional shape for the annular opening.

Disposed in the annular opening are a number of vanes which are angled slightly with respect to the centerline of the missile, so that reaction of the exhaust gases against the vanes imparts spin to the projectile in flight. The vanes may be stationary or may be movable in response to a control device, so that the projectile's flight can be controlled.

BRIEF DESCRIPTION OF THE DRAWINGS

The invention will be better understood if reference is made to the accompanying drawings, in which.

DESCRIPTION OF THE PREFERRED EMBODIMENTS

Figure 1:
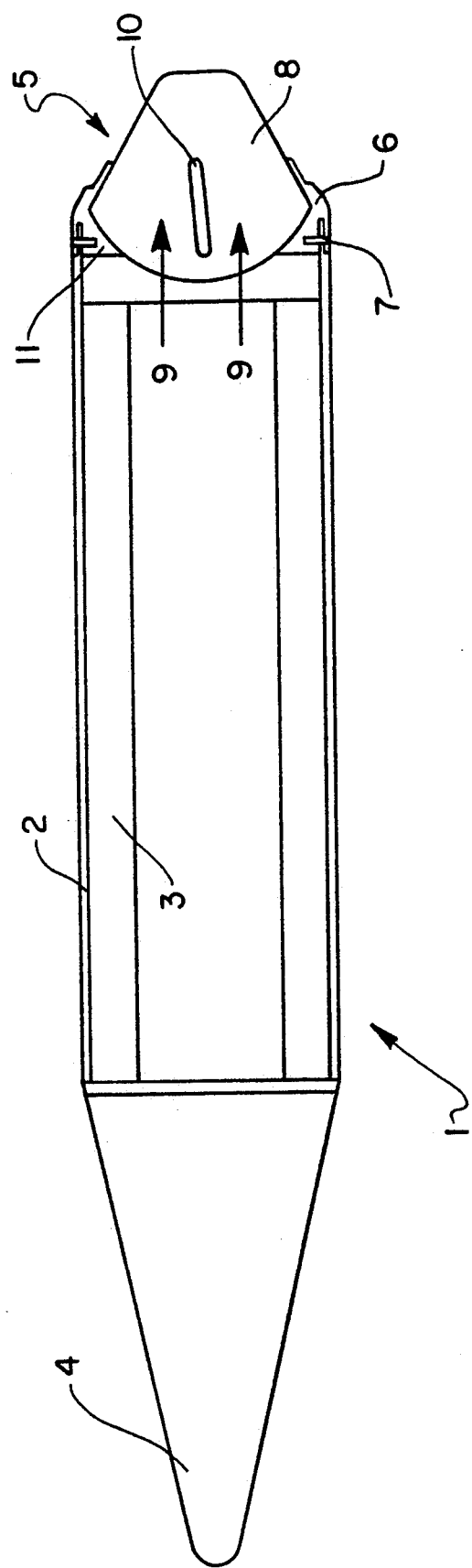
FIG. 1 shows a cross-sectional view of the missile according to the invention.

FIG. 1 shows a cross-sectional view of a missile 1 according to the invention. Missile 1 comprises a casing 2 which contains a charge 3 of a propellant material. As shown, the interior portion of the propellant is left open to provide a combustion surface. The missile 1 further comprises a aerodynamically-shaped warhead 4 which may include an explosive charge or may simply be of a relatively heavy metal such that upon impact it causes damage by spallation of the target. The missile 1 further comprises a plug nozzle assembly indicated generally at 5. Assembly 5 comprises a connecting ring 6, which is connected to the casing 2 by a plurality of pins 7, and which supports a plug 8. An annular passageway 9 (discussed below) for exhaust gases generated by combustion of the propellant 3 is formed between the plug 8 and connecting ring 6, save in the areas where plug supports 11 described below are located. As discussed in further detail below, the plug 8 is generally radially symmetric, except where the supports are formed, and its shape cooperates with that of the connecting ring 6 and the interior open end of the casing 2 to define an exhaust passageway 9 having a cross-sectional area varying in a predetermined manner from the interior of the missile 1 to the exterior. Thus the annular passageway 9 has a distinctly-varying shape designed to supply desired missile exhaust characteristics. In particular, the longitudinal variation of the cross-sectional shape of the annular passageway may be similar to that of a converging/diverging nozzle, as shown in some of the patents discussed above.

Disposed in the annular passageway 9 formed between the plug 8 and the cylindrical connecting ring 6 are a plurality of vanes 10 which may be inclined at a slight angle to the center line of the missile, as shown. This inclination of the vanes 10 will cause the missile to spin in flight, due to the reaction forces exerted on the vanes 10 by the exhaust gases from the combustion of the propellant 3. The detailed structure of the vanes 10 is discussed below.

As described generally above, the missile 1 according to the present invention may be provided in either of two embodiments. In a first embodiment, discussed in connection with FIGS. 2–4, the vanes 10 are movable responsive to control signals which may be provided by any suitable means. For example, the missile 1 may comprise an optical detector adapted to "see" a laser beam aimed by a gunner at a target; may be responsive to signals carried by optical fibers or wires trailed behind the missile and connected to a firing control unit; or may be responsive to gyroscopic, heat-seeking or other signals. In the second embodiment, discussed in connection with FIGS. 5–7, the positions of the vanes 10 are not altered during flight.

Figure 2:
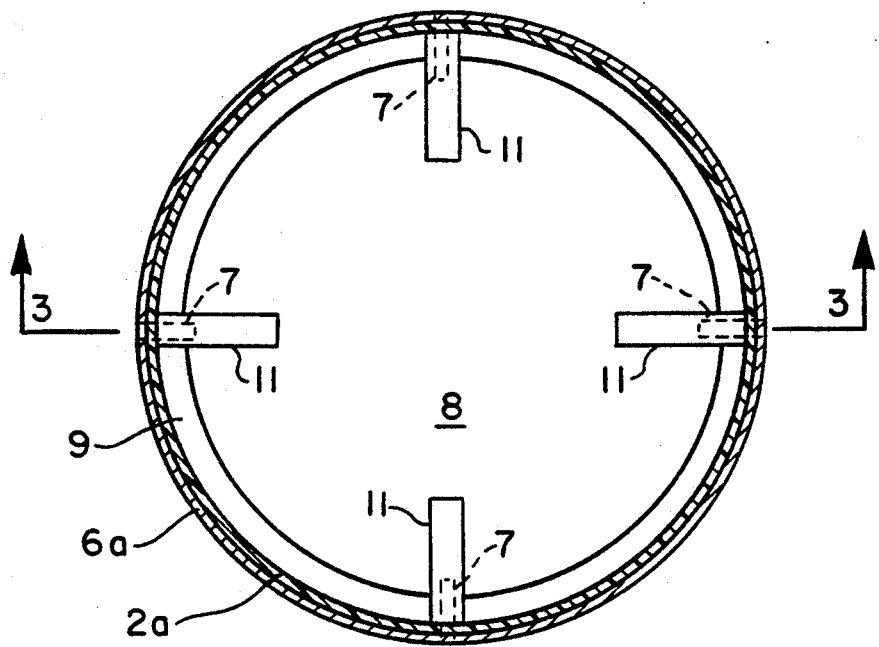
FIG. 2 shows a cross-sectional view taken at the joint of the casing and the plug nozzle assembly of the missile in a first embodiment of the invention, in which the vanes are movable.

FIG. 2 shows an end view of the inner end of the plug 8, as well as the surrounding structure. The casing 2 comprises a cylindrical lip 2a shown in cross section which extends within a mating lip 6a formed on the connecting ring 6. Pins 7 extend through the lips 2a and 6a and thereby lock the casing 2 to the connecting ring 6. The pins 7 also extend into support members 11 which are formed on the inner surface of the plug 8 facing the interior of the casing 2.

As shown in FIG. 2, an annular opening 9 extends between the plug 8 and the casing 2, except at the positions of support members 11. The exhaust gases from combustion of the propellant 3 flow through this annular opening 9. The relative shapes of the interior surface of the open end of the casing 2 and of the connecting ring 6 and the outer surface of the plug 8 define the manner in which the cross sectional area of the annular opening 9 varies axially, that is, along its length. Preferably the annular opening 9 defines a converging/diverging cross section, which decreases to a minimum value and then once again increases before the gases leave the tail of the missile completely. As is well known, this causes the exhaust gases to be accelerated leaving the missile, providing efficient use of fuel.

Figure 3:
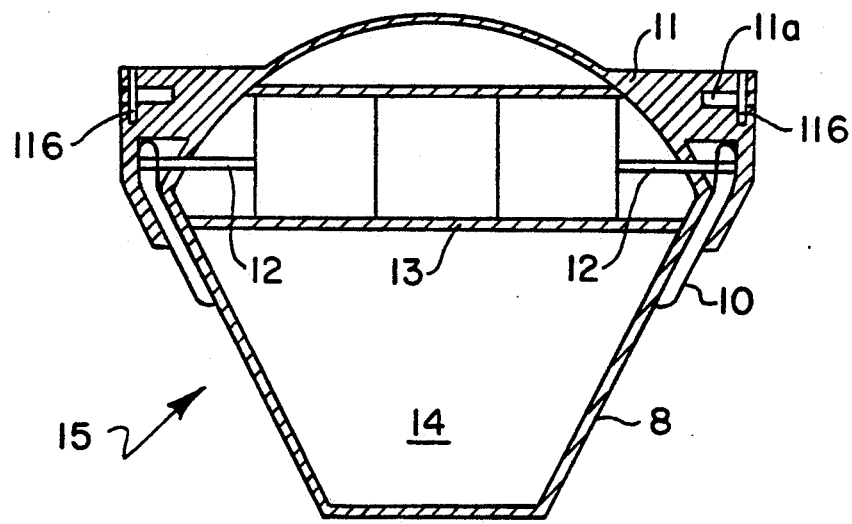
FIG. 3 is a cross-sectional view taken along the line 3—3 of FIG. 2.

FIG. 3 shows a cross-sectional view taken along line 3—3 of FIG. 2. This view illustrates the shape of the plug 8. As can be seen, the plug 8 is generally hemispherical on the side facing the interior of the missile, and is generally frusto-conical on the exhaust side. A servomechanism 13 is carried within the plug 8 and actuates movable vanes 10 via actuation pins 12. The servomechanism 13 may be responsive to control signals provided by any of several sources. For example, the missile may be wire guided, in which case it trails a wire leading to a gunner, who can then provide signals for moving the vanes 10, so as to alter the trajectory of the missile in flight. Alternatively, the warhead 4 (FIG. 1) may comprise means for generating a control signal, e.g., an optical device for detecting a laser beam aimed at the target by the gunner. Such expedients are generally known to the art and therefore will not be discussed specifically herein. The rearmost region 14 of the plug may be used for storage of batteries for powering the servomechanism 13.

As can be seen in FIG. 3, the plug 8 may advantageously be formed integrally with the support members 11, which have holes 11a formed in them into which the pins 7 (FIG. 2) extend. In this case, slits 11b, which receive the flange 2a of the casing (FIG. 2), are also formed extending into supports 11; pins 7 thus serve effectively to hold the casing and plug ring assemblies together. In this embodiment, the ring 6, plug 8 and supports 11 are formed integrally.

Figure 4:
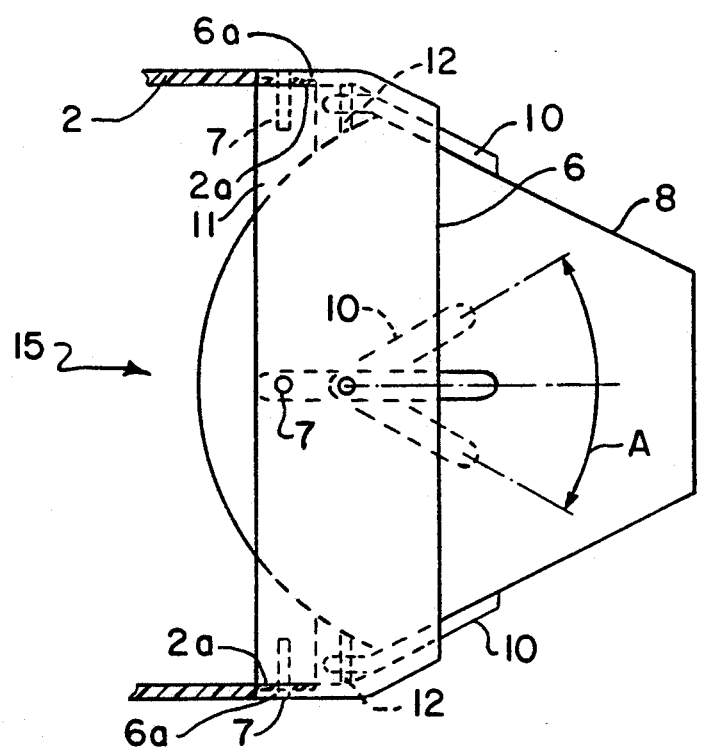
FIG. 4 is a detail view showing the assembly of the movable vanes to the plug nozzle assembly.

FIG. 4 shows a further detail of the assembly 15 of the plug 8, connecting ring 6, and vanes 10. As indicated, pins 7 pass through the lip 2a of casing 2 and into the support members 11 formed on the plug 8. In this embodiment the connecting ring 6 is formed separately from the plug 8.

Pivot pins 12 provide support for the moving vanes 10. As indicated by arrow A, the vanes 10 can preferably be rotated through a relatively wide angle, so as to allow substantial control of the flight path of the missile according to the invention.

Figure 5:
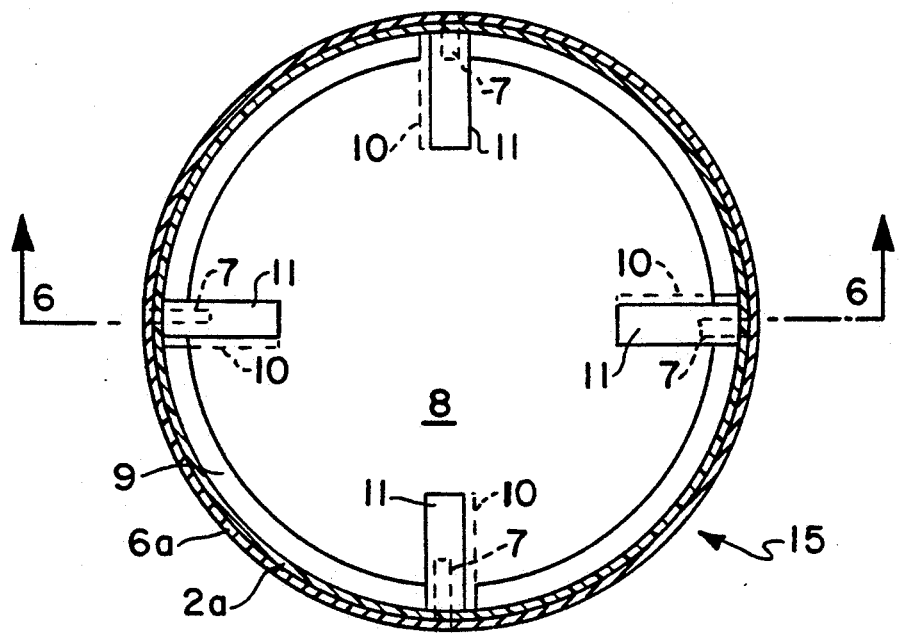
FIGS. 5, 6 and 7 correspond to FIGS. 2, 3 and 4 with respect to a second embodiment of the invention in which the vanes are fixed.
Figure 6:
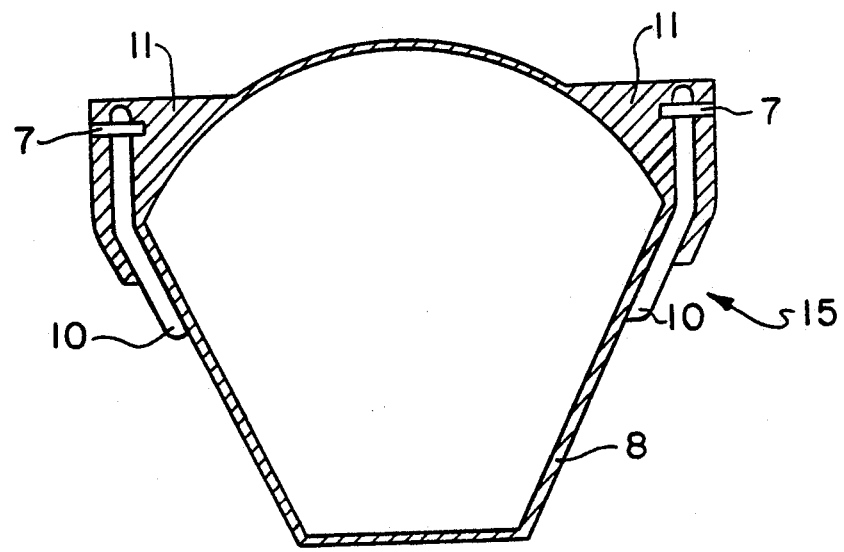
Figure 7:
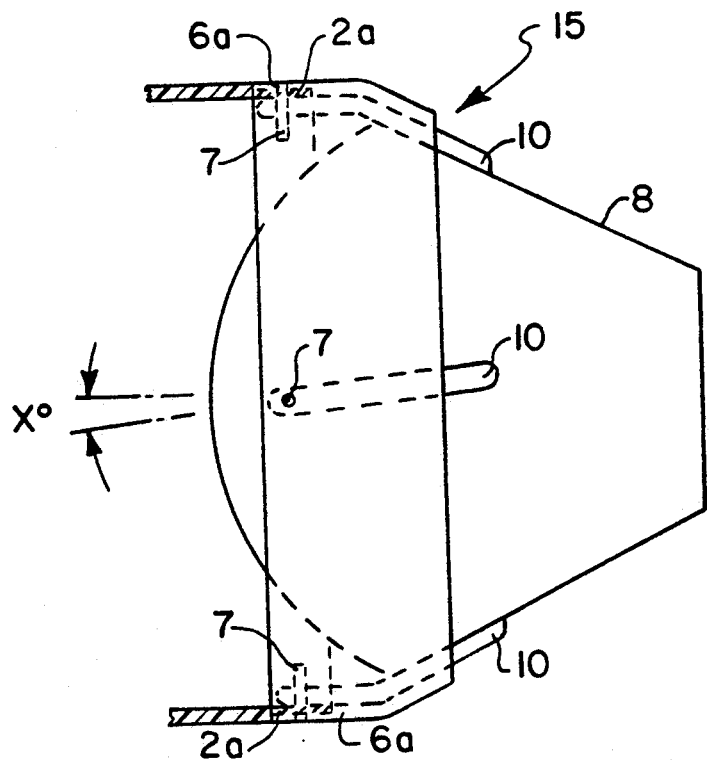

FIGS. 5–7 show a second embodiment of the connecting ring/plug/nozzle assembly 15 of the missile of the invention, in which the attitude of the vanes 10 is not altered while the missile is in flight. Accordingly, this embodiment of the invention is somewhat less complex and expensive to make, and hence may find substantial utility in somewhat different applications than the embodiment of FIGS. 2–4. The assembly 15 again comprises a plug 8, which as shown in FIG. 6, may integrally comprise support members 11 and ring 6. As shown in FIG. 5, pins 7 extend through flange 2a of the casing 2, flange 6a of the cylindrical connecting ring 6, and into the support member 11. The connecting ring also may be formed separately from the plug 8; as shown in FIG. 7, in this case connecting pins 7 serve to hold the ring 6 to the plug 8, and this assembly 15 to the casing. More particularly, the pins 7 again extend through a flange 6a of the connecting ring 6, into the flange 2a of the casing 2, and into the support members 11 of the plug 8. In this embodiment pins 7 also serve to secure the vanes 10, as indicated in FIGS. 6 and 7. Further simplicity and cost savings are thus realized for the missile according to the invention. In this embodiment, the angles of the vanes 10 are typically set to provide a chosen rate of spin providing a desired amount of stabilizing angular momentin to the missile, which is simply aimed at its target.

Those of skill in the art will be enabled to practice the invention claimed, given the disclosure of the invention provided above. More particularly, the selection of materials for the various components of the missile according to the invention can be made in accordance with generally well understood teachings. The outer casing 2 of the missile may be a fiber reinforced composite plastic material, while the material of the plug 8 will vary in dependence on the service desired. For example, if the particular missile 1 being designed is a quick-burn type which may consume all of its propellant 3 in five seconds or less, aluminum may be the preferred material for the plug 8 and vanes 10, due to its relative ease of fabrication. On the other hand, in a somewhat longer burning missile a more heat-resistant ceramic material may be required for the plug 8, the vanes 10, and so on.

A number of additional modifications and improvements on the invention will be apparent to those of skill in the art, and these are deemed to be within its spirit and scope where not specifically excluded by the following claims.

I claim:

1. An improved missile comprising:
   a generally cylindrical elongated casing for housing a combustible propellant, having an open rear nozzle end;
   an aerodynamically shaped forward member mounted on the front end of said casing;
   a radially symmetric plug disposed centrally within the open rear nozzle end of said casing and fixed with respect to said casing by a number of pins, wherein said pins extend into support means, said support means comprising a plurality of members formed integrally with said plug, the maximum diameter of said plug being less than the inner diameter of said open nozzle end of said casing, such that an annular passageway is defined between said plug and the inner surface of said casing, said support means extending from said plug into said annular passageway, wherein the space between said plug and the inner surface of said casing varies along the axis of the plug such that the cross sectional area of said annular opening varies in a predetermined manner; and
   a number of vanes disposed in said annular passageway to cause rotation of said missile upon combustion of said propellant.

2. The missile of claim 1 wherein said pins also support said vanes.

3. The missile of claim 1 wherein the open rear nozzle end of said casing is formed by a ring member.

4. The missile of claim 3 wherein said ring member is fixed to said casing by said pins.

5. The missile of claim 4 wherein said ring member is formed integrally with said support means.

6. An improved missile comprising:
   a generally cylindrical elongated casing for housing a combustible propellant, having an open rear nozzle end;
   an aerodynamically shaped forward member mounted on the front end of said casing;
   a radially symmetric plug disposed centrally within said open rear nozzle end of said casing, the maximum diameter of said plug being less than the inner diameter of said open nozzle end of said casing, such that an annular passageway is defined between said plug and the inner surface of said casing, the space between said plug and the inner surface of said casing varying along the axis of the plug such that the cross sectional area of said annular opening varies in a predetermined manner; and
   a number of vanes disposed in said annular passageway to cause rotation of said missile upon combustion of said propellant, wherein said vanes are movable during flight of said missile responsive to a control signal.

7. The missile of claim 6, wherein said vanes are moved by servomechanism means carried within said plug.

8. The missile of claim 7, wherein said servomechanism means is responsive to a signal transmitted to said missile from a remote location.

9. An improved missile comprising:
   a generally cylindrical elongated casing for housing a combustible propellant, having an open rear nozzle end formed by a ring member;
   an aerodynamically shaped forward member mounted on the front end of said casing;
   a radially symmetric plug disposed centrally within said open rear nozzle end of said casing and fixed with respect to said casing by a number of pins, the maximum diameter of said plug being less than the inner diameter of said open nozzle end of said casing such that an annular passageway is defined between said plug and said inner surface of said casing, the space between said plug and the inner surface of said casing varying along the axis of the plug such that the cross sectional area of said annular opening varies in a predetermined manner; and
   a plurality of vanes disposed in said annular passageway within said flow of said propellant combustion products to cause rotation of said missile upon combustion of said propellant.

10. The missile of claim 9 wherein said pins extend into support means, said support means comprising a plurality of members formed integrally with said plug and extending from said plug into said annular passageway.

11. The missile of claim 10, wherein said ring member is formed integrally with said support means.

12. The missile of claim 9 wherein said ring member is fixed to said casing by said pins.

13. An improved missile comprising:
   a generally cylindrical elongated casing for housing a combustible propellant, having an open rear nozzle end;
   an aerodynamically shaped forward member mounted on the front end of said casing;
   a radially symmetric plug nozzle disposed centrally within said open nozzle end of said casing, the maximum diameter of said plug being less than the inner diameter of said open nozzle end of said casing, such that an annular passageway is defined between said plug and the inner surface of said casing, the space between said plug and the inner surface of said casing varying along the axis of the plug such that the cross sectional area of said annular opening varies in a predetermined manner; and
   a plurality of vanes disposed in said annular passageway to cause rotation of said missile upon combustion of said propellant, at least some of said vanes being movable during flight of said missile responsive to a control signal.

14. The missile of claim 13 wherein said vanes are moved by servomechanism means carried within said plug.

15. The missile of claim 14 wherein said servomechanism means is responsive to a signal transmitted to said missile from a remote location.

16. An improved missile comprising:
a generally cylindrically elongated casing for housing a combustible propellant, having an open rear nozzle end;
an aerodynamically shaped forward member mounted on the front end of said casing;
a radially symmetric plug disposed centrally within said open rear nozzle end of said casing and fixed with respect to said casing by a number of pins, the maximum diameter of said plug being less than the inner diameter of said open nozzle end of said casing, such that an annular passageway is defined between said plug and the inner surface of said casing, configured and adapted for directing a flow of propellant combustion products exiting therethrough from said casing, the space between said plug and the inner surface of the casing varying along the axis of the plug such that the cross-sectional area of said annular opening varies in a predetermined manner; and
a plurality of vanes disposed in said annular passageway within said flow of said propellant combustion products to cause rotation of said missile upon combustion of said propellant.

* * * * *